US008042932B2

(12) United States Patent
Naivelt

(10) Patent No.: US 8,042,932 B2
(45) Date of Patent: Oct. 25, 2011

(54) DRUM PRINTER WITH CONTINUOUS LOAD-PRINT-UNLOAD CYCLE

(75) Inventor: Vladimir Naivelt, Petach Tiqwa (IL)

(73) Assignee: Hewlett-Packard Industrial Printing Ltd., Netanya (IL)

( * ) Notice: Subject to any disclaimer, the term of this patent is extended or adjusted under 35 U.S.C. 154(b) by 1011 days.

(21) Appl. No.: 11/831,127

(22) Filed: Jul. 31, 2007

(65) Prior Publication Data

US 2009/0033732 A1 Feb. 5, 2009

(51) Int. Cl.
*B41J 2/01* (2006.01)
*G01D 15/00* (2006.01)

(52) U.S. Cl. ........ 347/104; 346/103; 346/125; 346/138; 399/303

(58) Field of Classification Search .................. 347/101, 347/102, 104; 346/103, 125, 132, 138; 399/303
See application file for complete search history.

(56) References Cited

U.S. PATENT DOCUMENTS

| | | | |
|---|---|---|---|
| 4,225,872 A * | 9/1980 | Marinoff | 347/104 |
| 4,442,439 A * | 4/1984 | Mizuno | 347/74 |
| 5,276,464 A * | 1/1994 | Kerr et al. | 346/134 |
| 6,048,060 A * | 4/2000 | Narushima et al. | 347/104 |
| 6,247,809 B1 * | 6/2001 | Kashiwagi et al. | 347/104 |
| 6,260,482 B1 * | 7/2001 | Halup et al. | 101/477 |
| 6,714,232 B2 * | 3/2004 | Kerr et al. | 347/262 |
| 6,722,280 B2 * | 4/2004 | Shih | 101/483 |

* cited by examiner

*Primary Examiner* — Daniel Petkovsek

(57) ABSTRACT

The present invention is concerned with a drum printer in which the loading and unloading of printing medium onto and off a drum of the printer is performed without interrupting or decelerating the drum rotation and the printing process.

17 Claims, 8 Drawing Sheets

DRUM PRINTER WITH CONTINUOUS LOAD-PRINT-UNLOAD CYCLE

TECHNICAL FIELD

The printer and the method of printing medium loading and unloading relate to digital printing and particularly to high-speed inkjet printing.

BACKGROUND

Inkjet printing is well known in the art. The basics of this technology are described, for example by Jerome L. Johnson "Principles of Non-impact Printing", Palatino Press, 1992, Pages 302-336. ISBN 0-9618005-2-6. Commercial products such as computer printers, large format graphics printers and others exist.

An ink-jet print head consists of an array or a matrix of ink nozzles, with each nozzle selectively ejecting ink droplets towards a printing medium. The printing medium could be mounted on a drum, flat bed or just pulled from one roll to other. Relative movement between the print head and the medium allows image printing. Drum printers are the fastest of all known printer architectures, since at least in one direction (drum rotation) the medium movement is a continuous one. Recently, page wide or sheet wide arrays have become popular. They have further increased printer throughput. However, for exchange of the imaged or printed medium on a new one requires complete stop of the drum rotation.

This medium loading and unloading process, especially for wide format printers, where the medium may be 2×5 m2wide, reduces printer utilization and overall printer throughput. Therefore, there is a need in a method and printer that would perform the medium loading and unloading process without losing time and interrupting the printing process.

BRIEF LIST OF DRAWINGS

The printer and the method of loading and unloading the medium are particularly pointed out and distinctly claimed in the concluding portion of the specification. The apparatus and the method, however, both as to organization and method of operation, may best be understood by reference to the following detailed description when read with the accompanied drawings, in which like reference characters refer to the same parts throughout the different views. The drawings are not necessarily to scale, emphasis instead being placed upon illustrating the principles of the method.

DETAILED DESCRIPTION OF THE EXEMPLARY EMBODIMENTS

In the following detailed description, reference is made to the accompanying drawings which form a part hereof, and in which is shown by way of illustration specific embodiments in which the printer may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present printer and method are defined by the appended claims.

Figure 1:
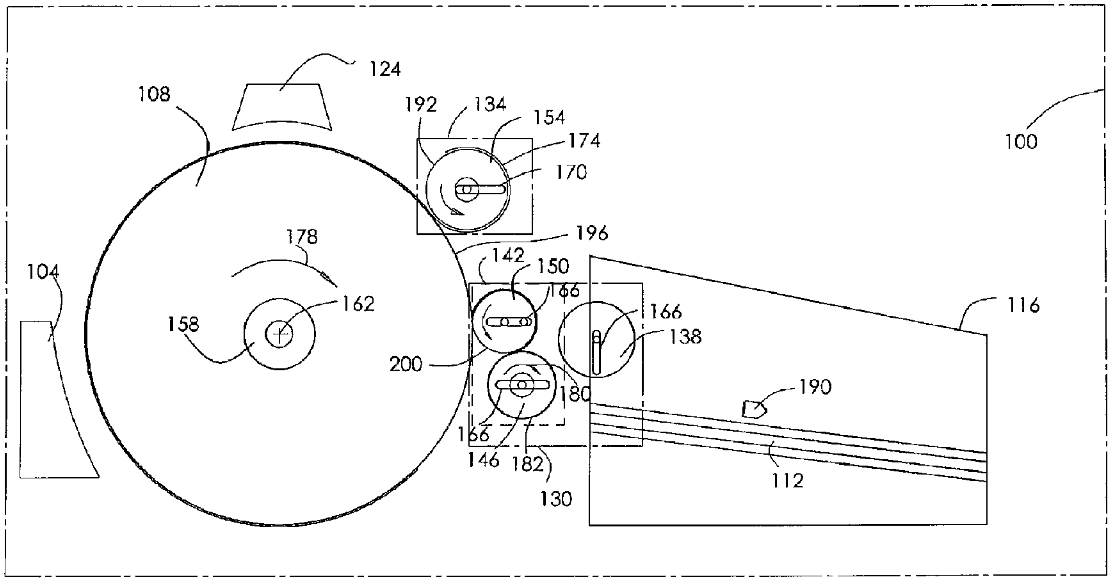
FIG. 1 is a schematic illustration of the present printer.

FIG. 1 is a schematic illustration of a side view of an exemplary embodiment of the printer. Printer 100 includes an inkjet print head 104 or an array of print heads, a substrate carrier such as for example, a drum 108, a medium loading cassette 112, a medium unloading surface or cassette 116, a curing or drying radiation source 124, medium loading module 130, and medium unloading module 134. Medium loading module 130 includes a medium pick-up platen 138 and a medium interim storage unit 142 consisting of autonomously driven platen 146 and peal-off platen 150. Medium unloading module 134 includes an autonomously driven take-up platen 154.

Drum 108 driven by motor 158, rotates around its rotational axis 162. Each of platens or platens 138, 146, and 150 of medium loading module 130 has a freedom of linear reciprocating movement in the directions shown by elongated oval openings 166. Autonomously driven take-up platen 154 of medium unloading module 134 has a freedom of linear reciprocating movement in the direction shown by elongated oval opening 170.

In one embodiment, drum 108 and platens 138, 146, 150, and 154 are connected to a common or separate vacuum systems that allow maintain the platen surfaces at a pressure below atmospheric. The vacuum holds the medium attached to each of the surfaces of drum 108 and platens 138, 146, 150, and 154. The pressure may be different at each of the surfaces and may be regulated as required by the process. In another embodiment, grippers may be used to hold or transfer medium from one platen to another and to/from the drum.

Print head 104 is usually an array, or a number of arrays, of monochrome or color printing inkjet print heads. For example, for printing with four conventional printing colors cyan, magenta, yellow, and black, it could be an assembly of four different arrays. In another embodiment, print head 104 is an assembly of eight individual arrays where in addition to four conventional printing colors a light cyan, light magenta, light yellow, and light black colors are added.

Depending on the type of ink, used drying or curing unit 124 may be a UV or other curing radiation unit or an IR or other heat generating unit.

Figure 2:
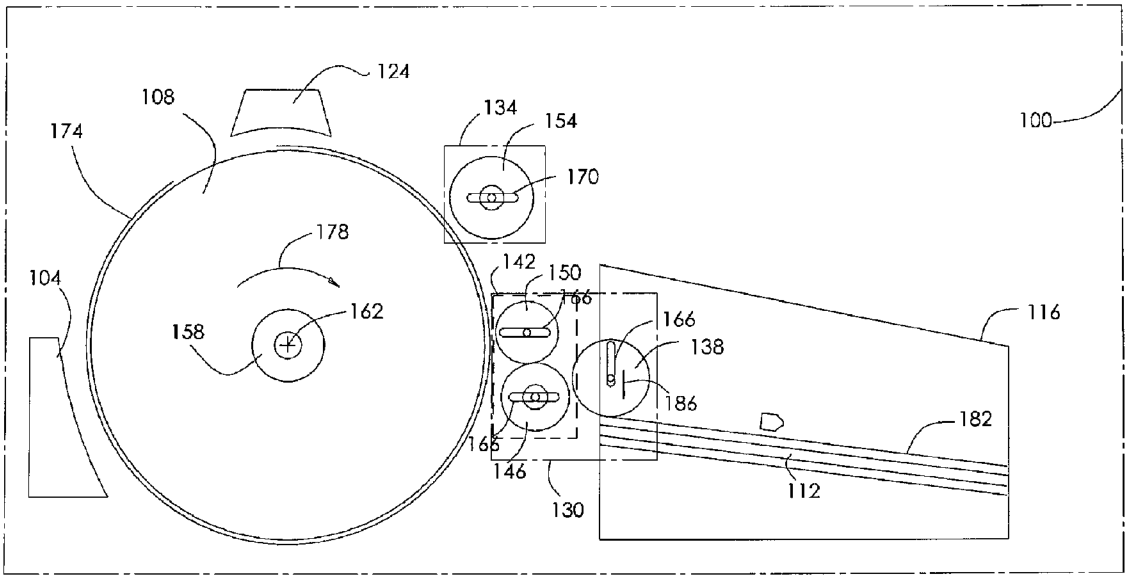
FIG. 2 is a schematic illustration of a stage in automatic medium loading sequence by the present printer.
Figure 8:
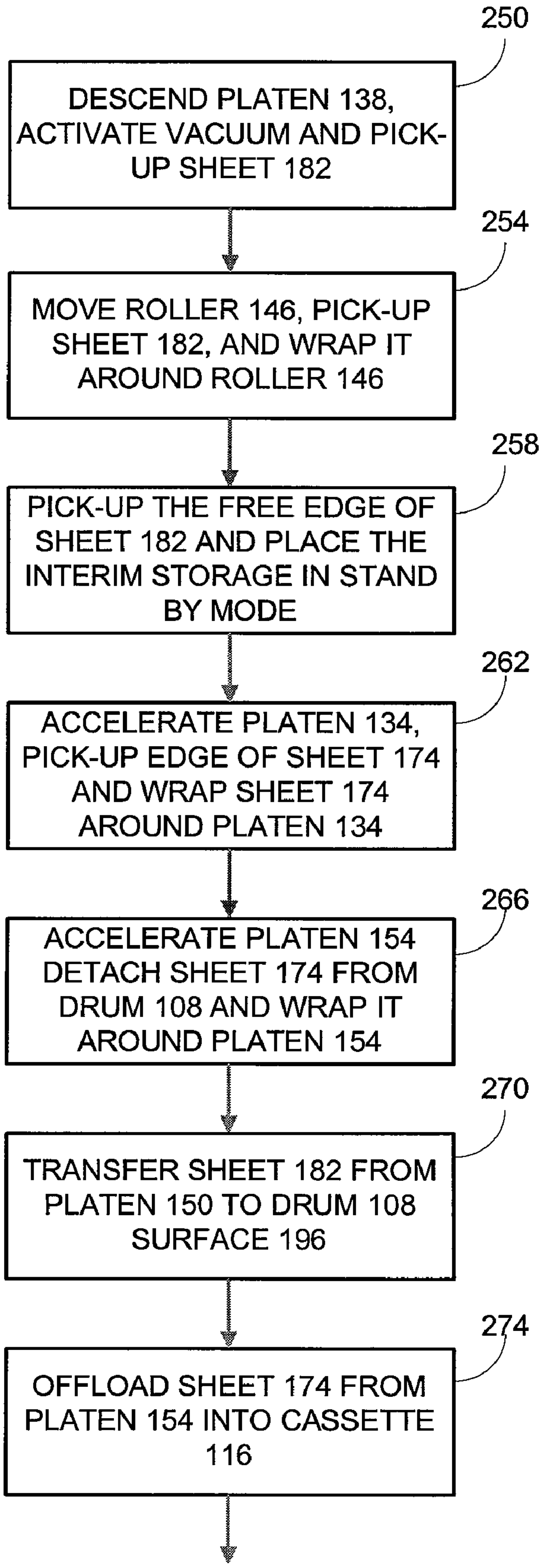
FIG. 8 is a flowchart of the continuous, automatic medium loading, printing, and unloading process.

FIG. 2 is a schematic illustration of a stage in automatic medium loading sequence by the present printer. It assumes that a sheet of medium 174 is loaded on drum 108 and the printing process is in progress. Arrow 178 indicates drum 108 rotation direction. In order to pick another sheet of medium 182, pick-up platen 138 descends, as illustrated by arrow 186, using oval opening 166 as a guide and encounters sheet 182. Vacuum is activated and sheet 182 attaches to platen 138 (Block 250 in FIG. 8).

Figure 3:
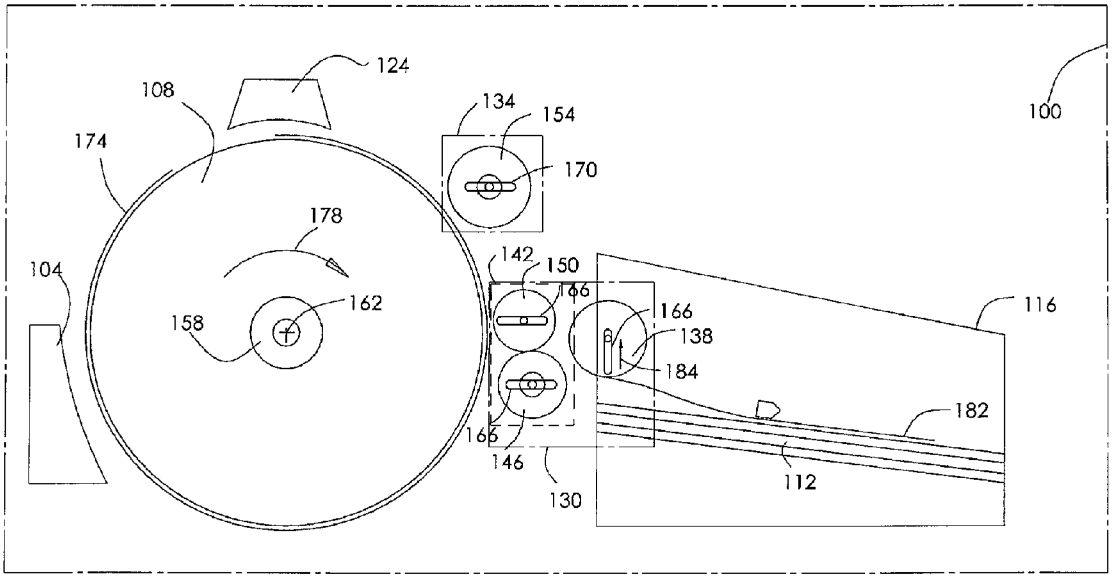
FIG. 3 is a schematic illustration of an additional stage in automatic medium loading sequence by the present printer.
Figure 4:
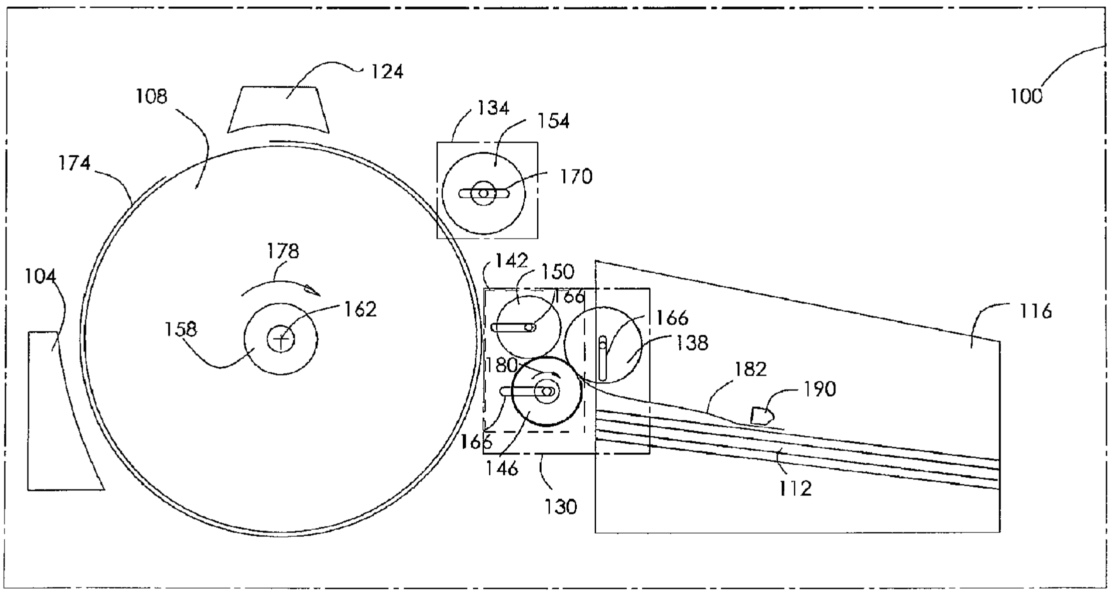
FIG. 4 is a schematic illustration of the medium to interim storage transfer stage of the present printer.

When sheet 182 is securely attached to platen 138, platen 138, as shown in FIG. 3, which illustrates an additional step in automatic medium loading sequence by the present printer, raises in the direction indicated by arrow 184, toward the initial position and pulls-up sheet 182. Platen 146 is slid in oval guide 166, such that it encounters platen 138 and applies certain pressure to it. The drive of platen 146 is switched ON, and platen 146 (FIG. 4.) begins to rotate in the direction indicated by arrow 180. Simultaneously, the vacuum that keeps platen 146 under pressure below atmospheric is activated. The vacuum in platen 138 is removed and a platen (not shown) or a flow of air generated by an air knife 190 tensions sheet 182 to be transferred from the medium loading cassette to platen 146 of interim storage module 130 (Block 254, FIG. 8). As platen 146 continues to rotate sheet 182, as illustrated in FIG. 4, sheet 182 gradually wraps around platen 146.

Figure 5:
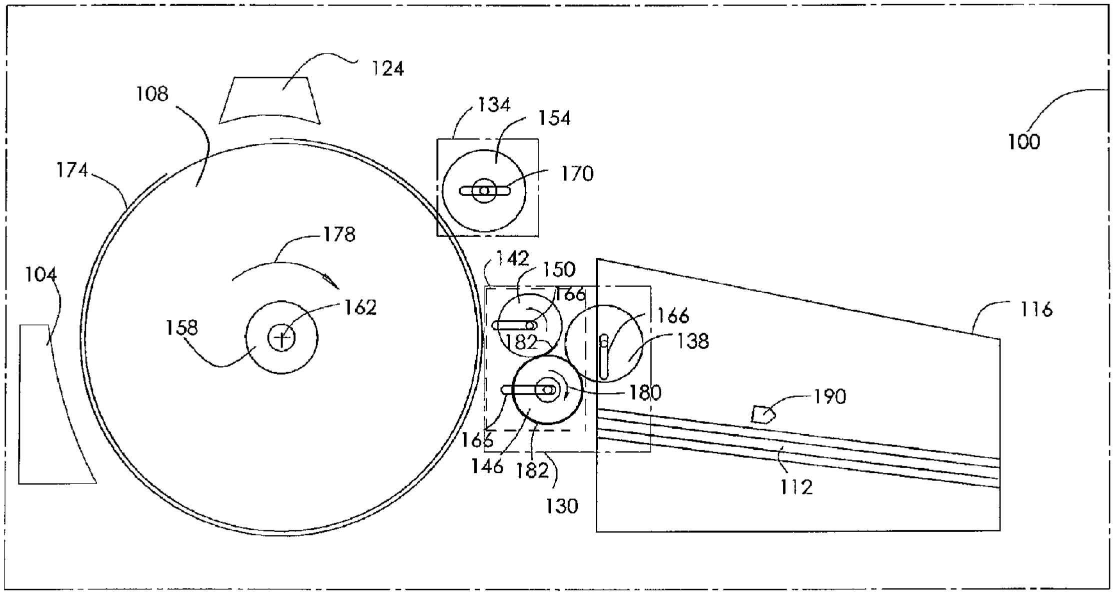
FIG. 5 is a schematic illustration of the medium in the interim storage movement.

FIG. 5 is a schematic illustration of the next stage in the automatic medium loading process. Platen 150 is advanced such that it encounters platen 146. Vacuum in platen 150 is activated and it attaches the free edge of sheet 182 to platen 150. This places interim storage module 142 with transferred to it medium sheet 182 in stand-by position (Block 258, FIG. 8).

Figure 6:
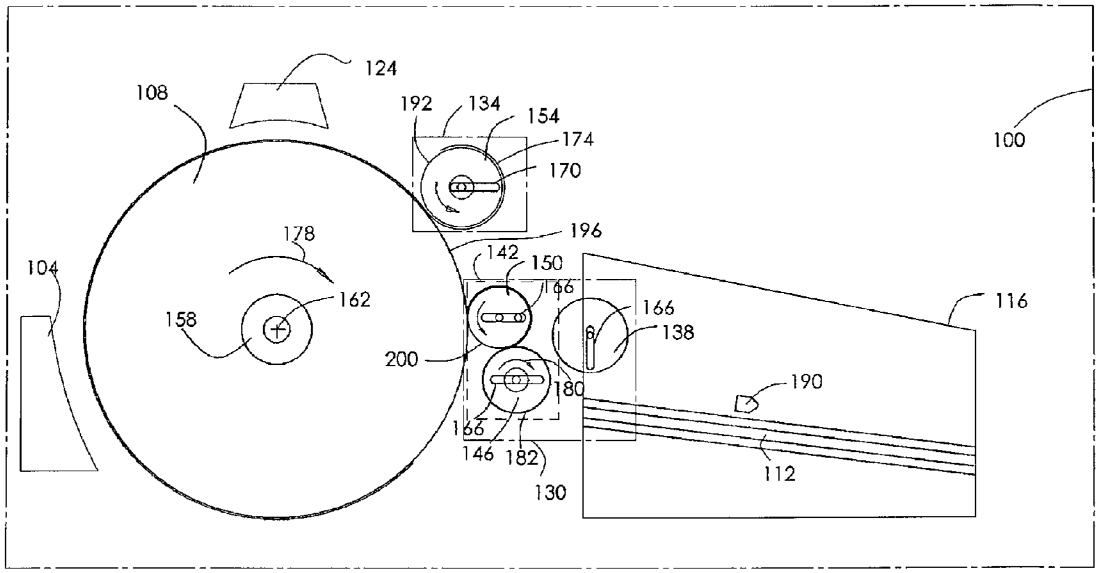
FIG. 6 is a schematic illustration of the simultaneous medium onto drum loading and unloading stages.

As the printing process terminates and it is possible to remove printed substrate 174 and replace it by substrate 182. FIG. 6 is a schematic illustration of the simultaneous medium onto drum loading and unloading stages. Autonomous drive initializes rotation of pick-up platen 154 and accelerates it such that the linear speed of the surface 192 of platen 154 becomes equal to the linear speed of the surface 196 of drum 108. Vacuum is activated in platen 154, and set to a level that allows detaching sheet 174 from surface 196 of drum 108. Continuous rotation of drum 108 and platen 154 peels sheet 174 of drum 108 and wraps sheet 174 around platen 154 (Block 266, FIG. 8). Platen 154 with sheet 174 distances from drum 108.

Concurrently interim storage module 130 departs from platen 138, which returns to its stand-by position. Autonomous drive initializes rotation of platen 146 and transmits this rotation by friction to peel-off platen 150 that picks-up the free edge of sheet 182 and peels-off sheet 182 from platen 146. In the mean time platen 146 accelerates such that the linear speed of the surface 200 of platen 150, or actually the speed of sheet 182 becomes equal to the linear speed of the surface 196 of drum 108. Platen 150 with sheet 182 engages the free from sheet 174 drum 108 surface and attaches to it sheet 182 (FIG. 6). Vacuum in drum 108 and platen 150 are regulated to facilitate the process. Continuous rotation of drum 108 and platen 150 wraps sheet 182 around drum 108 (Block 270, FIG. 8).

Figure 7:
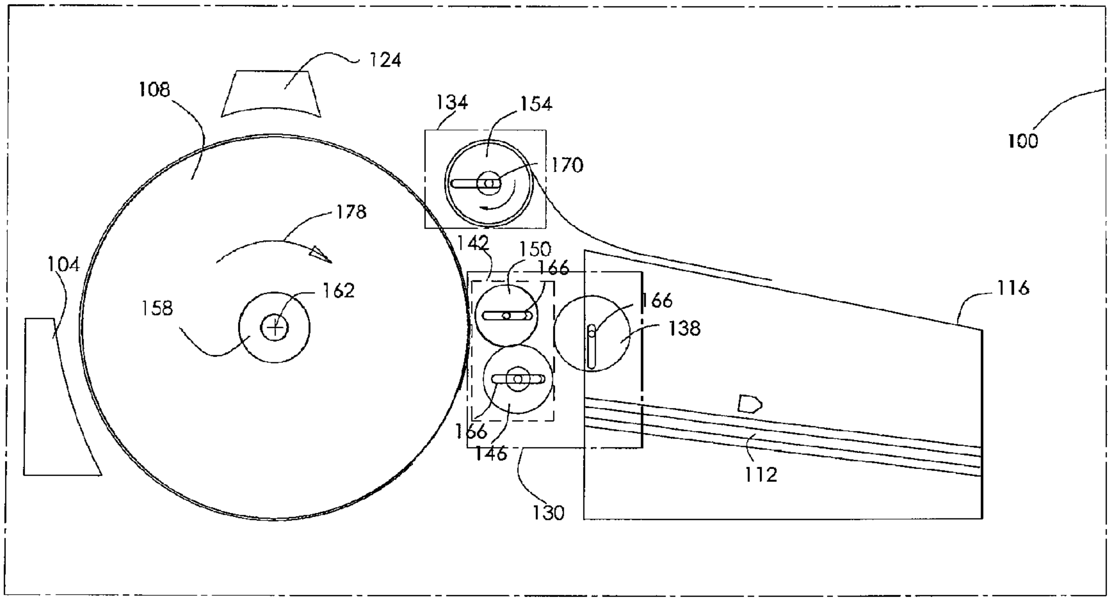
FIG. 7 is a schematic illustration of the medium unloading stage.

FIG. 7 is a schematic illustration of the last medium unloading stage of the automated load-unload process. The printing on a newly loaded substrate 182 begins without disrupting or decelerating drum 108 rotation. Platen 154 distances from drum 108 and as it continues to rotate, it offloads printed sheet 174 into unloading surface or cassette 116.

The printer and continuous medium loading, printing, and unloading method described significantly improve the utilization of the printer and associated with it throughput. Uninterrupted printing is possible, as well as automatic loading of different sheet formats.

Although specific embodiments have been illustrated and described herein, it will be appreciated by those of ordinary skill in the art that a variety of alternate and/or equivalent implementations may be substituted for the specific embodiments shown and described without departing from the scope of the present printer and method. This application is intended to cover any adaptations or variations of the specific embodiments discussed herein. Therefore, it is intended that this printer and method be limited only by the claims and the equivalents thereof.

What is claimed is:

1. A drum printer with continuous medium loading, printing, and unloading cycle, said printer comprising:
- a. a drum;
- b. a medium loading module for loading said medium on the drum; and
- c. a medium unloading module for unloading said medium from the drum; wherein said drum, said medium loading module, and said medium unloading module are configured to unload a first medium sheet while concurrently loading a second medium sheet without decelerating rotation of said drum.

2. The drum printer according to claim 1, wherein said medium loading module comprises a pick-up platen and medium interim storage unit.

3. The drum printer according to claim 2, wherein said medium interim storage unit comprises an autonomously driven platen and peel-off platen.

4. The drum printer according to claim 3, wherein said medium unloading module comprises an autonomously driven take-up platen.

5. The drum printer according to claim 4, wherein at least one of said platens of the loading and unloading modules comprise at least one additional degree of linear movement.

6. The drum printer according to claim 4, comprising means for applying a below atmospheric pressure to a surface of at least one of said platens of said loading and unloading modules.

7. The printer according to claim 4 comprising a medium unloading cassette and wherein said take-up platen is capable of linear movement towards and away from said unloading cassette.

8. The printer according to claim 4, wherein said take-up platen is capable of linear movement towards and away from said drum.

9. The printer according to claim 3, wherein said peel-off platen is capable of linear movement towards and away from said drum.

10. The printer according to claim 4, wherein said peel-off platen and/or said take-up platen may be accelerated to a rotational velocity where the linear velocity of the surface of said platen is substantially equal to the linear velocity of the surface of said drum during the printing process.

11. The printer according to claim 2 comprising a medium loading cassette and wherein said pick-up platen is capable of linear movement towards and away from said loading cassette.

12. The drum printer according to claim 1, comprising:
- a. an inkjet print head for ejecting ink droplets toward said medium, and
- b. at least one of a curing or drying unit.

13. The drum printer according to claim 12, wherein said curing unit comprises a UV curing unit.

14. A method of operating a drum printer to provide a continuous medium loading, printing, and unloading cycle, said method comprising:
- a. loading a print medium on a drum with a medium loading module; and
- b. unloading said print medium from the drum with a medium unloading module, wherein successive sheets of said print medium are concurrently loaded and unloaded onto/from said drum without decelerating drum rotation.

15. A method of claim 14, further comprising:

lifting a sheet from a cassette using a pick-up platen; and loading the sheet into an interim medium storage unit by rolling the sheet around a driven platen.

16. The method of claim 15, further comprising moving the sheet into a stand-by position by advancing a peel-off platen to encounter the driven platen and engaging the peel-off platen with the free edge of the sheet wrapped rolled around the driven platen.

17. The method of claim 16, in which concurrently loading and unloading successive sheets comprises:

accelerating a pick-up platen such that the linear speed of the surface of the pick-up platen is equal to the linear speed of an outer surface of the drum and peeling off a printed sheet from the drum; and concurrently accelerating the driven platen such that the speed of the sheet is equal to the linear speed of the outer surface of the drum and the peel-off platen engages with outer surface of the drum and attaches the sheet to the outer surface of the drum.

* * * * *